Patented July 6, 1954

2,682,686

UNITED STATES PATENT OFFICE 2,682,686

CARBON BODIES AND METHOD OF MANUFACTURING THE SAME

Stanislaw Mrozowski, Buffalo, N. Y., assignor to Great Lakes Carbon Corporation, Morton Grove, Ill., a corporation of Delaware No Drawing. Application August 17, 1949, Serial No. 110,870

16 Claims. (Cl. 18—47.5)

This invention relates to novel carbonaceous and graphitic bodies and to methods for preparing the same. More particularly the invention relates to articles formed essentially from carbon and whose properties render them useful in the production of carbons for batteries, electronic equipment, resistors, and ultra filters.

The usual method of manufacturing consolidated carbon bodies involves the mixing of a carbon aggregate of suitable particle size, which aggregate may be selected from compositions such as petroleum coke and coke produced from coal. A carbon aggregate usually having less than one per cent of volatile matter is admixed with a binder. The latter is conventionally a coal tar or petroleum pitch or similar materials derived from asphaltic materials or wood distillation residues. The carbon aggregate and binder may be mixed together at a temperature of about 125° C. in order to produce a comparatively uniform mix. The resulting mixture is then extruded or molded at elevated pressures in order to form so-called "green" carbon bodies. The latter are then baked to a temperature of about 1000° C. In addition, the baked materials may be graphitized to temperatures at about 2500° C. The resultant baked carbon bodies are useful as fuel, or depending upon the presence of a suitable carbon aggregate, for example of the type produced from petroleum coke, as electrodes for electrothermal and electrolytic processes.

For the production of carbon ultra filters a binder having a lower carbon residue than the above mentioned pitch binders is employed. In such event, the binder is subsequently decomposed during the baking cycle, leaving a minimum of bonding agent which causes the carbon particles to adhere to one another. This results in a more porous though structurally weak carbon body, useful for the purpose intended. In the event that electrolytic carbons are desired, it is preferable practice to impregnate the carbon bodies formed in accordance with the aforementioned process, usually placing the carbon bodies in a liquefied carbonaceous material such as coal tar or pitch. A vacuum is then applied to the system, resulting in removal of air from the carbon bodies and the filling of the voids with the liquefied impregnant. This results in an increase of density and reduces the porosity of the carbon body, which properties are useful in such applications as carbon electrodes for electrolytic purposes.

It is an object of the invention to provide improved carbon bodies suitable for the manufacture of dry batteries, electronic equipment, resistors, and the like.

It is a further object of the invention to provide improved porous carbon bodies suitable for use as ultra filters.

It is a further object of the invention to provide an improved process for the production of carbon bodies whereby solid, hard, dense carbon bodies may be formed without the use of binders and the conventional methods of preparing electrodes.

It is a further object of the invention to provide carbon bodies consisting of substantially uniform particles resulting in improved structure of said bodies particularly with respect to density, crushing strength, etc.

It is a further object of the invention to provide an improved process for the production of carbon and graphitic bodies having a high density and high electrical resistivity.

The above objects as well as others which will become apparent upon complete understanding of the invention as hereinafter fully described are achieved by heating a compressed or consolidated composition comprising essentially carbon particles of small size whose surface contains oxygen in chemical combination with the carbon. The heating is conducted at an elevated temperature to volatilize the chemically combined oxygen present on the surface of the particles. This results in a binding together of the particles to form carbon bodies of high crushing strength, high density, high electrical resistivity and low thermal conductivity.

The types of carbon useful in carrying out the instant novel process may be defined within the scope of the expression "carbon particles" as used herein and in the appended claims. It has been observed that the surfaces of certain types of carbonaceous materials contain oxygen in chemical combination with the carbon on the surface, and the present process takes advantage of this in preparing the carbon bodies which are the subject of the invention. The presence of chemically combined oxygen in the carbon particles may be ascertained usually by preparing an aqueous slurry of the particles and determining the pH of the resulting mixture. A slurry having a pH below 7 is indicative of the presence of oxide of carbon in or on the particle.

The maximum benefits to be derived from my invention are achieved when the combined oxygen is on the surface of the particles although it is also within the scope of my invention to employ carbon particles which have combined oxygen present in the pores thereof. The presence of the desired surface-combined oxygen can be determined by suitable powder resistivity techniques in addition to the aforementioned pH measurements.

The chemically combined oxygen present on the surface of the particle is to be further distinguished from merely adsorbed or absorbed oxide of carbon. Such adsorption or absorption is evidenced by the so-called activated carbons, for example of the type produced from wood charcoal, and presumably the gases are not in chemical combination with the carbon absorbent. The chemically combined oxygen which is present on the carbon particles which may be treated in accordance with the instant process is further characterized by its removal from the carbon particles at elevated temperatures, for example above 600° C. Certain calcination processes are utilized for this operation. As will be further illustrated herein, a carbon particle whose surface contains no oxygen in chemical combination with the carbon, for instance one which has been heated above about 800° C., is not suitable for the preparation of carbon bodies which are the subject of this invention.

Among the types of carbon particles which are suitable for carrying out the instant process are lamp black, channel black and thermal carbon. These terms are characteristic of the method of manufacture of certain carbon blacks. For example, thermal carbon or thermatomic carbon is produced by subjecting hydrocarbon gases to thermal decomposition with or without the use of a diluent gas, whereby the carbon is decomposed in a retort without substantial oxidation of the gas. It has been observed that such carbon blacks exhibit the presence of a chemically combined oxygen upon the surface of the particles. The so-called channel blacks or lamp blacks are produced by burning hydrocarbon gases against cold metal surfaces upon which the carbon black is deposited and from which it may be scraped. Certain types of carbon particles in the class of furnace blacks, for example acetylene black, do not exhibit the presence of a chemically combined oxygen on their surfaces when manufactured, but such materials may be rendered amenable to the instant process in accordance with procedures which will be subsequently herein described. The carbon blacks which are useful in the instant process are further to be differentiated from the so-called graphitic oxides which do not respond to the type of process which is the subject of this invention.

In a specific embodiment of the invention, a quantity of carbon particles, preferably having an average particle size less than one micron, and whose surface contains oxygen in chemical combination with the carbon, is compressed in a suitable container. The pressure may vary over a broad range, that is, from about 10 pounds per square inch to about 10,000 pounds per square inch, or higher, depending upon the end product desired. Thus, if a porous carbon body is to be manufactured for use as an ultrafilter, pressures on the order of 10 to 100 pounds per square inch are useful. If carbon bodies of high crushing strength are desired, compression of the particles may be carried out under 1,000 to 10,000 pounds per square inch. The externally applied pressure may then be released and the consolidated composition uniformly heated to a temperature above about 800° C. Alternatively, the heating operation may continue while the consolidated carbon composition is still subjected to a portion of the externally applied pressure sufficient to equalize the lateral compression forces existing in the compressed material. After a suitable period of time which constitutes a baking cycle, the product is cooled and is found to consist of a hard, dense, substantially uniform carbon body. These products are further characterized by and distinguished from carbon bodies formed by baking carbon particle-pitch binder mixtures in that they are quite porous and are wet by and absorb fairly large quantities of hydrophillic liquids such as water. The resulting products are useful in the manufacture of dry batteries, electronic equipment, electrical resistors, lead pencils or ultrafilters. The crushing strength of the products made by application of pressures greater than 500 pounds per square inch is above 1000 pounds per square inch, and the apparent density is usually above about 1.0. These properties will vary depending upon the particle size of the carbon aggregate, the type of carbon, the amount of chemically combined oxygen on the surface of the carbon particles, as well as upon the pressure and baking temperature to which the carbon composition is subjected.

The oxygen-containing film which is necessarily present on the surfaces of the carbon particles which are treated in accordance with the instant process may be formed either during the preparation of certain carbon products mentioned above or may be formed by contacting certain carbon products with air or oxygen either during or following their formation.

Another, but considerably less preferred method, comprises subjecting carbonaceous materials to a suitable type of attrition or comminuting operation in the presence of an oxygen-containing gas, as for example by grinding in a ball, Raymond or hammer mill. This grinding operation may be conducted at low temperatures or at elevated temperatures less than about 500° C., depending upon the rate of reaction desired. Thus, it is possible to treat carbon particles which, by the nature of their manufacture, cannot form carbon bodies in accordance with the instant process, in such a manner that they become useful in my process. For example, it is possible to grind coke which may be of either petroleum or coal origin in the presence of air to a suitable state of division, thereby providing the surface of the resulting carbon particles with a coating containing oxygen in chemical combination. This coating can be subsequently removed by heating, preferably at temperatures above 600° C., thus forming the carbon bodies of my invention.

The pressure to which carbon particles whose surfaces contain oxygen in chemical combination are subjected depends upon the product desired and may vary between about ten and about ten thousand pounds per square inch. The chemically combined oxygen present on the surface of the carbon particles is removed at temperatures above about 600° C., and this heating operation may be conducted uniformly to temperatures between about 1000° and about 1500° C. The heating operation may be conducted after release of externally applied pressure or a portion thereof, or preferably, while the carbon particles are still confined to a definite predetermined volume and under such applied pressure that the lateral compression forces in the compressed mixture will be approximately equalized by the applied force during heating.

The carbon bodies which are the subject of this invention may be prepared from a composition comprising essentially carbon particles whose surface contains oxygen in chemical combination, or alternatively, such composition may contain minor amounts of other compositions, for example, inorganic salts such as the halide salts of sodium, potassium, calcium, etc., which are useful in the production of arc carbons in that such chemicals impart luminescence and/or color to the carbon arc. It is essential that the quantity of material in the composition other than carbon particles whose surface contains oxygen in chemical combination be maintained such that an adequate number of the carbon particles adhere to each other to form a consolidated, hard, dense structure when subjected to the aforementioned pressure and temperature conditions.

In order to more fully illustrate the nature and character of the invention, but with no intention of being limited thereby, the following examples are set forth:

*Example I*

Commercially available thermal carbon black having an average particle size (diameter of 0.07 micron was placed in a cylinder and subjected to a pressure of about 6000 lbs. per square inch. After release of the pressure, the sample was baked at 1000° C. for a period of about twenty-four hours. The cooled product was removed from the cylinder and was found to be a solid, hard, dense carbon body. The apparent density of the material is about 1.25 and its electrical resistivity is about or less than 0.025 ohms/in$^3$. This material has a crushing strength of about 3000 lbs. per square inch. The aforementioned results are quite remarkable considering the fact that the carbon particles were substantially free from volatile matter or extraneous binder.

A sample of the thermal carbon used above was compressed to 6000 lbs. per square inch at room temperature resulting in the formation of a very weak consolidated carbon body having an apparent density of about 1.18. This material was extremely fragile and broke down upon ordinary handling.

*Example II*

A sample of thermal carbon identical to that used in Example I was heated to a temperature of about 1000° C. and was then subjected to compression in a cylinder at a pressure of about 6000 lbs. per square inch. The density of the consolidated material while under compression is about 1.09. After release of the pressure, the material expanded to a fragile material having an apparent density of about 1.0.

When the above described carbon bodies are graphitized to a temperature of about 2500° C., a shrinkage of about 30% and a corresponding increase in the apparent density of the carbon bodies occurs.

*Examples III*

Several grams of channel black having an average particle size of about 50 Angstroms were compressed in a cylinder at a pressure of about 4500 lbs. per square inch. After release of pressure, the material was heated without removing it from the cylinder over a period of about twenty-four hours to a temperature of 1000° C.

The product consisted of a hard, dense carbon body.

*Example IV*

A ten gram sample of thermal furnace black having an average particle size of about 0.07 micron was subjected to a pressure of about 5,000 to 6,000 lbs. per square inch and was heated to a temperature of about 1000° C. for a period of about four hours. The resulting product had a density of 1.24; resistivity of 0.0096 ohms/in.$^3$; crushing strength about 3000 lbs. per square inch.

*Example V*

A carbon body produced in accordance with the process as described in Example IV was graphitized to a temperature of 2500° C. The electrical resistivity of the resulting material was 0.025 ohm/in.$^3$ or an increase of about 2.5 over the resistivity of the baked material. Shrinkage in all cases occurred during graphitization, and the increase in density observed was from 1.24 to 1.41.

While the above examples illustrate certain methods for producing carbon bodies in accordance with the instant novel process, it is to be understood that the invention is not limited to the specific details herein set forth. Furthermore, other types of carbon particles whose surfaces contain oxygen in chemical combination with the carbon may be employed in addition to those set forth. For example, thermal or thermatomic carbon particles having the following average particle size (microns) have been employed, 0.274, 0.10, 0.074; channel blacks having an average particle size of 0.030, 0.016; and lamp blacks having an average particle size of 0.10 micron have also been successfully used in producing consolidated, hard, dense carbon bodies having comparatively high resistivities and high crushing strength.

Furthermore, the invention is not to be deemed limited to the use of carbon particles whose surfaces contain oxygen in chemical combination and which result during or following the formation of the carbon particles. As previously described herein, it is possible to form a surface on various types of carbons which surfaces contain oxygen in chemical combination with the carbon by various physical means, for example by grinding, milling, etc. in the presence of an oxygen-containing gas.

Having thus fully described the nature and character of the invention, what is desired to be secured by Letters Patent is:

1. A process for forming carbon articles which comprises heating a confined, previously compressed composition consisting essentially of carbon particles whose surfaces contain oxygen in chemical combination with the carbon, and maintaining said particles in intimate and direct contact with each other at a temperature and for a time sufficient to volatilize substantially all of the oxygen chemically combined with the carbon.

2. A process according to claim 1 wherein the carbon particles are less than about 1 micron in size.

3. A process for forming carbon articles which comprises heating a composition consisting essentially of carbon particles whose surfaces contain oxygen in chemical combination with the carbon, maintaining said particles in intimate and direct contact with each other after compression of said particles in a container at a pressure above about 10 p. s. i., and maintaining at least a portion of the applied pressure during said heating at a temperature above about 600° C. for a time sufficient to volatilize substantially all the oxygen in chemical combination with the carbon.

4. A process according to claim 3 wherein the carbon particles consist of thermatomic carbon.

5. A process for forming carbon articles which comprises compressing in a container at a pressure above about 100 p. s. i. a composition consisting essentially of carbon particles having surfaces containing oxygen in chemical combination with the carbon, releasing the force employed to effect said compression and heating the consolidated product while in the container and with the particles in intimate and direct contact with each other at a temperature above about 800° C. for a time sufficient to volatilize substantially all of the oxygen chemically combined with the carbon.

6. A process for forming carbon articles which comprises compressing a composition consisting essentially of carbon particles whose surfaces contain oxygen in chemical combination with the carbon in a container into a confined volume where the particles are in intimate and direct contact with each other and heating the confined material at a temperature above about 800° C. while substantially maintaining the initial volume of the compressed carbon composition for a time sufficient to volatilize substantially all of the oxygen chemically combined with the carbon.

7. A process for forming carbon articles which comprises comminuting carbon particles in the presence of a gas containing free oxygen, consolidating the resultant product in a container by applying a pressure above about 100 p. s. i., heating the confined, compressed product at a temperature above about 800° C. in the absence of any agent capable of completely coating the particles and thereby preventing intimate and direct contact between said particles for a time sufficient to volatilize substantially all the oxygen chemically combined with the carbon.

8. A process for forming carbon articles which comprises compressing in a container at a pressure between about 100 and about 5000 p. s. i. a composition consisting essentially of thermal furnace black particles having an average particle size of about 0.07 micron, and gradually heating the consolidated composition while in the container and while maintaining the particles in intimate and direct contact with each other through a temperature of about 1000° C. for a period of time between about one and forty-eight hours to volatilize substantially all of the oxygen chemically combined with the carbon.

9. A process according to claim 7 wherein the carbon particles are comminuted to a size less than about 1 micron.

10. A process for forming carbon articles which comprises compressing into a mold a composition consisting essentially of carbon particles whose surfaces contain oxygen in chemical combination with the carbon, and heating the resulting compressed composition while retained in the mold and in the absence of any agent capable of completely coating the particles and thereby preventing intimate and direct contact between said particles after compression, said heating being conducted at a temperature and for a time sufficient to volatilize substantially all of the oxygen chemically combined with the carbon.

11. A carbon article having high density and a compressive strength greater than 1000 p. s. i. and consisting essentially of a plurality of discrete carbon particles in direct and intimate contact with each other and having an average particle size of less than about one micron, said particles being bonded together by a process which comprises heating at a temperature between about 600° to about 1500° C. a confined, previously compressed composition consisting essentially of carbon particles whose surfaces contain oxygen in chemical combination with carbon for a time sufficient to volatilize substantially all of the oxygen chemically combined with the carbon.

12. A product according to claim 11 wherein the particles employed in its preparation are thermatomic carbon.

13. A product according to claim 11 wherein the particles employed in its preparation are channel black.

14. A product according to claim 11 wherein the particles employed in its preparation are lamp black.

15. A carbon article having high density and a compressive strength greater than 1000 p. s. i. and consisting essentially of a plurality of discrete carbon particles in direct and intimate contact with each other and having an average particle size of less than about one micron, said particles being bonded together solely by a process which comprises heating at a temperature between about 600° to about 1500° C. a confined, previously compressed composition consisting essentially of carbon particles whose surfaces contain oxygen in chemical combination with carbon for a time sufficient to volatilize substantially all of the oxygen chemically combined with the carbon.

16. A carbon article having high density of a compressive strength greater than 1000 p. s. i. and consisting essentially of a plurality of discrete carbon particles in direct and intimate contact with each other and having an average particle size of less than about one micron, said particles being bonded together by a process which comprises heating at a temperature between about 600° to about 1500° C. a confined, previously compressed composition consisting essentially of carbon particles whose surfaces contain oxygen in chemical combination with the carbon and in the absence of any agent capable of completely coating the particles and thereby preventing intimate and direct contact between said particles after compression, said heating being conducted for a time sufficient to volatilize substantially all of the oxygen chemically combined with the carbon.

References Cited in the file of this patent

UNITED STATES PATENTS

| Number | Name | Date |
| --- | --- | --- |
| 263,145 | Edison | Aug. 22, 1882 |
| 2,260,746 | Hanawalt et al. | Oct. 28, 1941 |
| 2,457,962 | Whaley | Jan. 4, 1949 |

OTHER REFERENCES

Venuto: India Rubber World, June 1947, page 369.